(12) United States Patent
Funahashi et al.

(10) Patent No.: US 7,194,202 B2
(45) Date of Patent: Mar. 20, 2007

(54) WATERPROOF PROTECTOR DEVICE AND WATERPROOF PROTECTOR SYSTEM USING THE SAME

(75) Inventors: Koji Funahashi, Tokorozawa (JP); Seiichi Ohira, Tokyo (JP)

(73) Assignee: Olympus Corporation, Toyko (JP)

( * ) Notice: Subject to any disclaimer, the term of this patent is extended or adjusted under 35 U.S.C. 154(b) by 196 days.

(21) Appl. No.: 10/993,465

(22) Filed: Nov. 19, 2004

(65) Prior Publication Data
US 2005/0115852 A1 Jun. 2, 2005

(30) Foreign Application Priority Data
Nov. 28, 2003 (JP) ............................. 2003-400859

(51) Int. Cl.
*G03B 17/08* (2006.01)
(52) U.S. Cl. ...................................... 396/27
(58) Field of Classification Search .................. 396/25, 396/27, 29; 348/81, 373–376; 206/316.2
See application file for complete search history.

(56) References Cited
U.S. PATENT DOCUMENTS
5,077,567 A * 12/1991 Haraguchi et al. ............ 396/29

2003/0133199 A1 * 7/2003 Inoue .......................... 359/673

FOREIGN PATENT DOCUMENTS
JP 2002-090854 3/2002

* cited by examiner

*Primary Examiner*—W. B. Perkey
*Assistant Examiner*—Rishi S. Suthar
(74) *Attorney, Agent, or Firm*—Volpe & Koenig (57) ABSTRACT

A waterproof protector system comprises a body protector which stores a camera body, a first port member to be attached to the body protector, and a second port member to be attached to the first port member. The body protector is formed having a first opening portion. The first port member has a second opening portion to be fitted in the first opening portion, a third opening portion larger in diameter than the second opening portion, and a conical barrel portion formed between the second opening portion and the third opening portion. The first port member houses an accessory member, such as a wide-conversion lens. The second port member has a fourth opening portion, fittable in the third opening portion, and a light transmitting portion.

12 Claims, 6 Drawing Sheets

WATERPROOF PROTECTOR DEVICE AND WATERPROOF PROTECTOR SYSTEM USING THE SAME

CROSS-REFERENCE TO RELATED APPLICATIONS

This application is based upon and claims the benefit of priority from prior Japanese Patent Application No. 2003-400859, filed Nov. 28, 2003, the entire contents of which are incorporated herein by reference.

BACKGROUND OF THE INVENTION

1. Field of the Invention

This invention relates to a waterproof protector device capable of storing, for example, a digital camera and a system using the same.

2. Description of the Related Art

Conventionally, waterproof protectors (waterproof cases) have been used to protect cameras for underwater photography. A conventional waterproof protector, such as the one described in Jpn. Pat. Appln. KOKAI Publication No. 2002-90854, houses a camera body together with a camera lens.

There is also known a waterproof protector that can be fitted as required with an accessory member, such as a close-up lens or wide-conversion lens, on its front side. A mount portion that has a thread or the like is formed around a light transmitting portion that is opposed to the front face of the waterproof protector or of camera lens, that is the front face of the camera lens for example. The accessory member is removably mounted by utilizing the mount portion.

In an example of the conventional device, the accessory member is attached to the mount portion of the waterproof protector. If the camera body is dislocated with respect to the protector, the respective optical axes of the accessory member and the camera body are misaligned, so that the image quality may be lowered, in some cases.

In order to solve the above problem, a waterproof protector may possibly be proposed that has an accessory storage space large enough to house the accessory member. In this waterproof protector, the camera body and the accessory member are housed integrally with each other. By doing this, the optical axes of the accessory member and the camera body can be maintained accurately.

However, the wide-conversion lens, an example of the accessory member, has its front-side outside diameter much larger than its rear-side outside diameter. A large-capacity waterproof space is required to allow the accessory member of this type to be put into or taken out of the accessory storage space from inside the waterproof protector. Thus, the protector is so bulky as a whole that it is awkward to handle during transportation or photographing operation, and besides, its buoyancy in water is unduly high. Canceling the buoyancy in water inevitably requires a heavier weight.

BRIEF SUMMARY OF THE INVENTION

This invention has a feature that a waterproof protector device is capable of smoothly storing a relatively large-sized accessory member, such as a wide-conversion lens, and a system using the same.

A waterproof protector device according to the invention comprises: a body protector, a first port member and a second port member. The body protector has an opening opposed to a front face of a camera lens and a first opening portion provided around the opening and can store a camera body in a waterproof manner. The first port member has a second opening portion connectable to the first opening portion, a third opening portion located nearer to a subject than the second opening portion and larger than the second opening portion, and a conical barrel portion connecting the second opening portion and the third opening portion, and can store an accessory member attachable to the front face of the camera lens. The second port member has a fourth opening portion connectable to the third opening portion, a light transmitting portion provided on the side of the subject opposite the fourth opening portion with respect to the optical axis direction, and a barrel portion connecting the fourth opening portion and the light transmitting portion, and covers the third opening portion with the fourth opening portion connected to the third opening portion, thereby waterproofing respective inside spaces of the body protector and the first port member.

In a system using the waterproof protector device of the invention, the accessory member can be attached to and detached from the camera body from outside the body protector with the first port member connected to the body protector.

According to the waterproof protector device of the invention, a relatively large-sized accessory member, such as a wide-conversion lens, can be housed integrally with the camera body in a waterproof space. In the waterproof protector device of the invention, the accessory member can be attached directly to the camera body or its camera lens, so that the respective optical axes of the camera body and the accessory member cannot be misaligned.

Further, a waterproof space is defined by the first port member to be attached to the body protector and the second port member larger in diameter than the first port member. Thus, a wide-conversion lens or other accessory member that has a large outside diameter on its front side can be housed in a waterproof space that has a relatively small internal capacity.

Preferably, waterproof seal members, such as O-rings, are arranged between the first opening portion and the second opening portion and between the third opening portion and the fourth opening portion, individually.

Preferably, moreover, the accessory member can be attached to the camera body or the camera lens with the first port member attached to the first opening portion of the body protector and with the second port member off the first port member. A wide-conversion lens is an example of the accessory member.

Preferably, furthermore, a standard port can be attached to the first opening portion of the body protector with the first port member off the first opening portion.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An embodiment of the present invention will now be described with reference to FIGS. 1 to 6.

Figure 1:
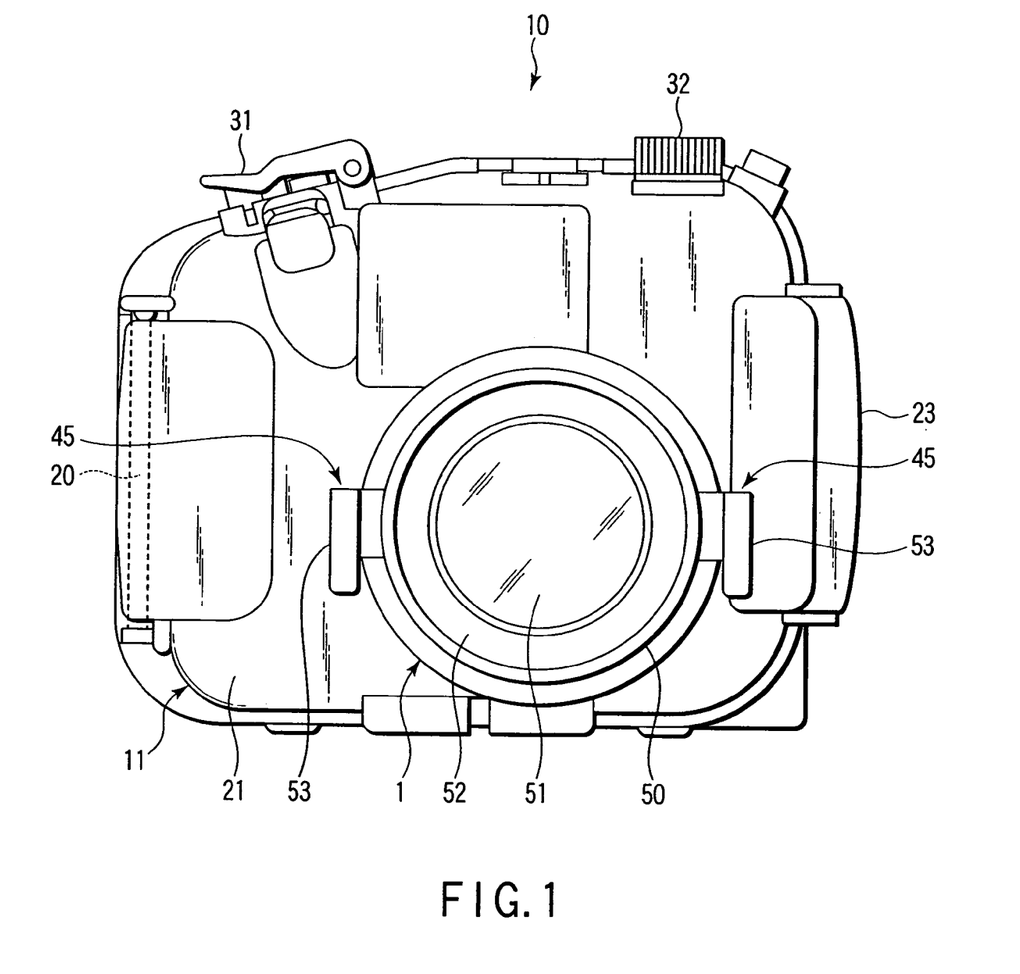
FIG. 1 is a front view of a waterproof protector device according to an embodiment of the invention.

FIG. 1 is a front view of a waterproof protector device (waterproof case) 10 having a standard port 1. The protector device 10 comprises a body protector 11 (described below), the standard port 1 (shown in FIGS. 2 and 3), and/or a wide port 70 (shown in FIGS. 5 and 6). Both the standard and wide ports 1 and 70 can be attached to and detached from the body protector 11.

Figure 2:
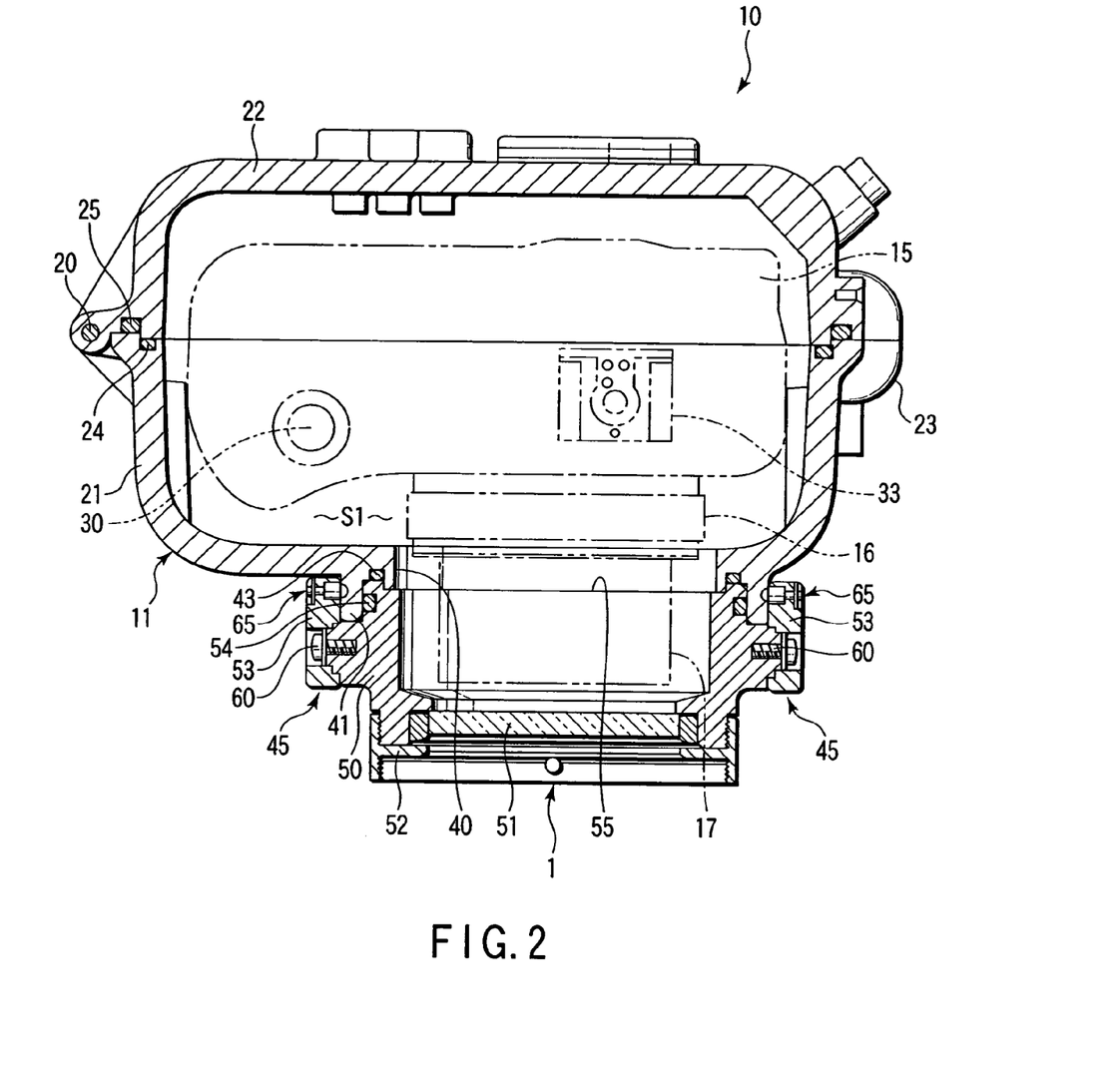
FIG. 2 is a cross-sectional view of the waterproof protector device shown in FIG. 1.

FIG. 2 is a cross-sectional view of the waterproof protector device 10 having the standard port 1. As shown in FIG. 2, a waterproof space S1 is defined in the body protector 11. The space S1 is surrounded by the protector 11 and the standard port 1. A camera body 15, such as a digital camera, is disposed for waterproofness in a predetermined position in the space S1.

The camera body 15 is provided with a frame 16. The frame 16 has an internal thread portion to which a filter or the like is to be attached. When a power switch (not shown) of the camera body 15 is turned on, a camera lens 17 as a moving part projects forward, as shown in FIG. 2. The lens 17 projects forward or toward a subject from the inside diameter side of the frame 16.

The body protector 11 is provided with a body portion 21 and a lid portion 22. The lid portion 22 is rockably coupled to the body portion 21 by a hinge shaft 20 shown in FIG. 2. The body portion 21 and the lid portion 22 are each formed of a molded product of synthetic resin (e.g., polycarbonate) that is impermeable to water and highly resistant to pressure. The body portion 21 and the lid portion 22 can be held in a closed state by a clamp mechanism 23. Waterproof seal members 24 and 25, such as O-rings, are arranged in joint portions of the body portion 21 and the lid portion 22, respectively.

The body protector 11 is provided with an operating member 31 (shown in FIG. 1). The operating member 31 is used to operate a release button 30 (shown in FIG. 2 and other drawings) of the camera body 15. Further, the body protector 11 is fitted with various necessary operating members for the manipulation of the camera body 15, a cap 32 that covers a relay connector portion (not shown) for external stroboscope, etc. The camera body 15 is provided with a hot shoe 33 (shown in FIGS. 2 and 3). The hot shoe 33 has electric contacts that are used for strobe-synchronous luminescence and the like.

A circular opening 40 is formed in the body portion 21 of the body protector 11. The opening 40 is formed in a region corresponding to the front face of the frame 16 of the camera body 15. The inside diameter of the opening 40 is a little larger than the diameter of the frame 16 and is large enough to allow the insertion of the camera lens 17 at the least.

Figure 3:
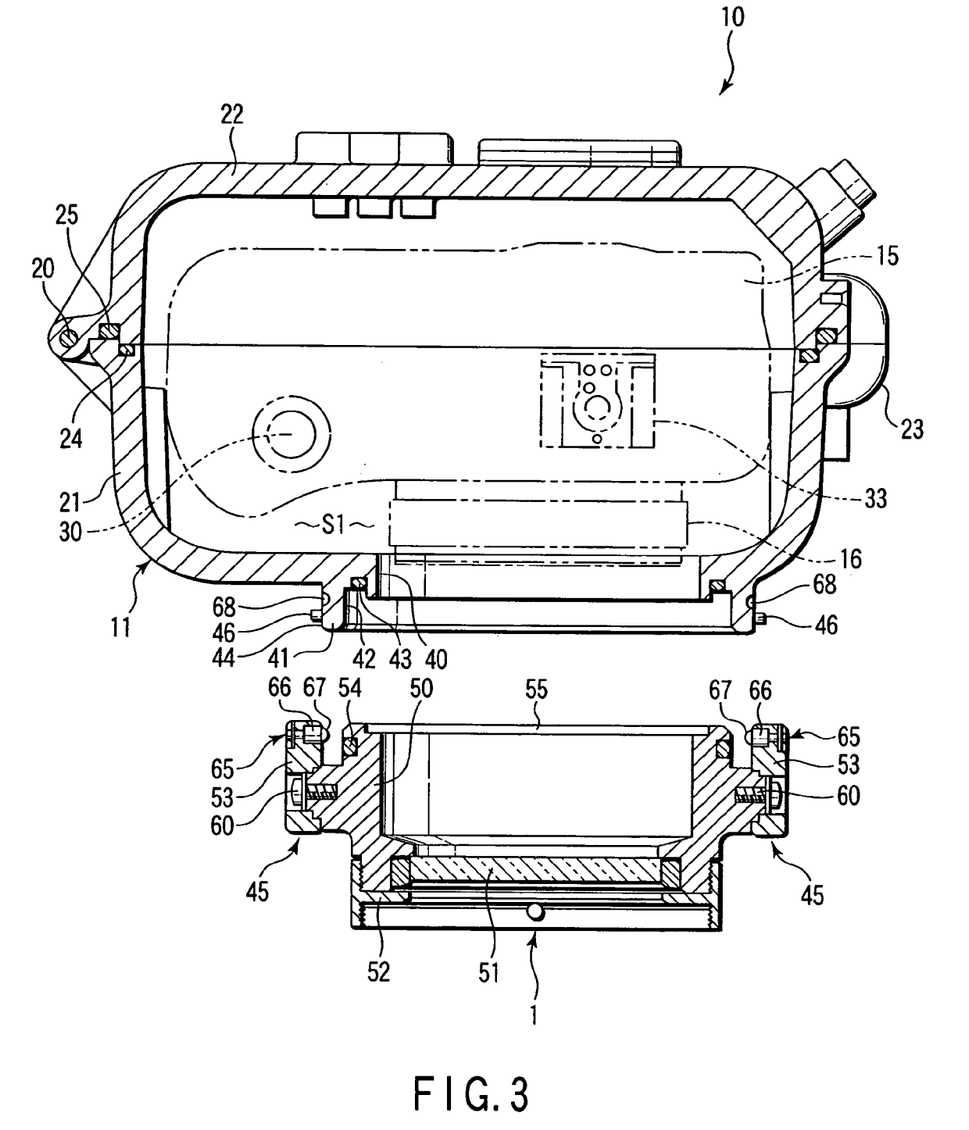
FIG. 3 is a cross-sectional view of the waterproof protector device of FIG. 1 with its standard port off its body protector.

A first opening portion 41 in the shape of a short cylinder is formed around the opening 40 on the outer surface of the body protector 11. The first opening portion 41 is larger in diameter than and concentric with the opening 40. An inner peripheral surface 42 of the first opening portion 41 forms a seal surface with which a seal member 54 is intimately in contact. To attain this, the inner peripheral surface 42 is finished smooth. An O-ring 43 that serves as a waterproof seal member is interposed between the opening 40 and the first opening portion 41. As shown in FIG. 3, a pair of protrusions 46 are formed on an outer peripheral surface 44 of the first opening portion 41. Each of the protrusions 46 forms a part of a buckle mechanism 45.

The standard port 1 is provided with a substantially cylindrical barrel portion 50, a light transmitting portion 51 formed of a transparent material such as glass, a hood member 52, a pair of buckle members 53, and a seal member 54 such as an O-ring. The light transmitting portion 51 is provided on the front end portion of the barrel portion 50. An opening portion 55 at the rear end of the barrel portion 50 can be fitted in the first opening portion 41. If necessary, the hood member 52 is attached to the barrel portion 50. The buckle members 53 are provided individually on the opposite side portions of the barrel portion 50. The seal member 54 is disposed on the rear end portion of the barrel portion 50. It can be brought intimately into contact with the inner peripheral surface 42 of the first opening portion 41.

The buckle members 53 and the protrusions 46 constitute the buckle mechanisms 45. The buckle members 53 can rock individually around shafts 60 between a locked position shown in FIG. 4A and an unlocked position shown in FIG. 4B. They may alternatively be designed to be further rockable in the direction of arrow R1 from the position shown in FIG. 4B.

Figure 4A:
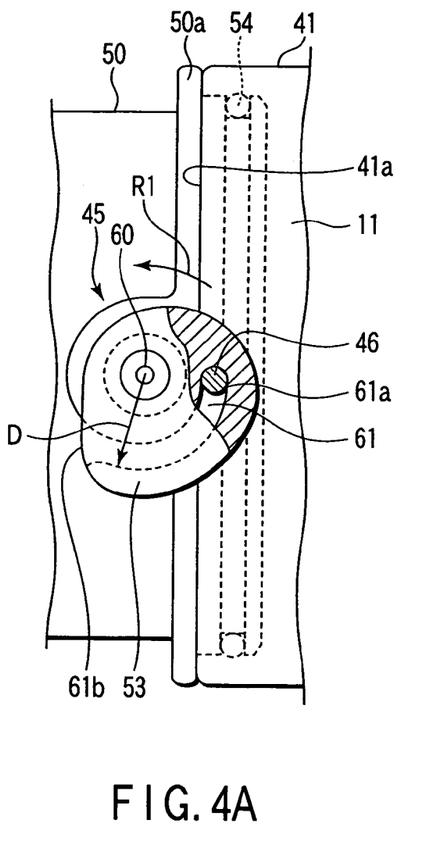
FIG. 4A is a side view of a part of the waterproof protector device of FIG. 1 with its buckle member in a locked position.
Figure 4B:
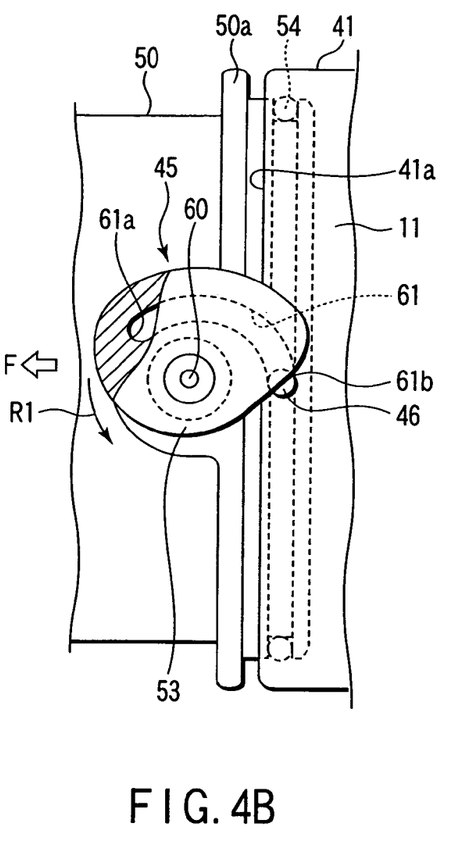
FIG. 4B is a side view of a part of the waterproof protector device of FIG. 1 with the buckle member in an unlocked position.

As shown in FIGS. 4A and 4B, a cam groove 61 is formed on the inner surface side of each buckle member 53. The cam groove 61 has a spiral shape such that a distance D from the shaft 60 gradually increases from its one end 61a toward its other end 61b. When each buckle member 53 is rocked to the locked position shown in FIG. 4A, each protrusion 46 gets fitted in a region on the side of the one end 61a of the cam groove 61. Thus, a flange portion 50a of the barrel portion 50 of the standard port 1 is pressed in a direction such that it abuts against a front end face 41a of the first opening portion 41. At the same time, the standard port 1 is fixed to the body protector 11.

If each buckle member 53 is rocked in the direction (unlocking direction) indicated by arrow R1 in FIG. 4A, the cam groove 61 moves sliding relatively to the protrusion 46 in the direction of arrow R1. Thereupon, the flange portion 50a of the barrel portion 50 is slightly pushed out in a direction (indicated by arrow F) such that it moves away from the front end face 41a of the first opening portion 41, as shown in FIG. 4B. When the buckle member 53 reaches the unlocked position shown in FIG. 4B, the protrusion 46 is disengaged from the cam groove 61. Thereupon, the standard port 1 is allowed to be removed from the body protector 11. In attaching the port 1 to the protector 11, the buckle member 53 is rocked in the direction opposite to the unlocking direction R1. By doing this, the port 1 is fixed to the protector 11.

As shown in FIGS. 2 and 3, each buckle member 53 is provided with a detent mechanism (click means) 65. The detent mechanism 65 includes a retaining member 67. The retaining member 67 is urged by a spring portion 66 to project from the inside of the buckle member 53. The body protector 11 is formed having recesses 68 in which the retaining members 67 can be fitted individually. The recesses 68 are situated so that they engage their corresponding retaining members 67 when the buckle members 53 are moved to the locked position.

When the buckle members 53 are moved to the locked position, the retaining members 67 engage their corresponding recesses 68. If this is done, the positions of the buckle members 53 are settled, and a so-called click feeling is produced. Thus, the arrival of the buckle members 53 at the locked position can be noticed.

Figure 5:
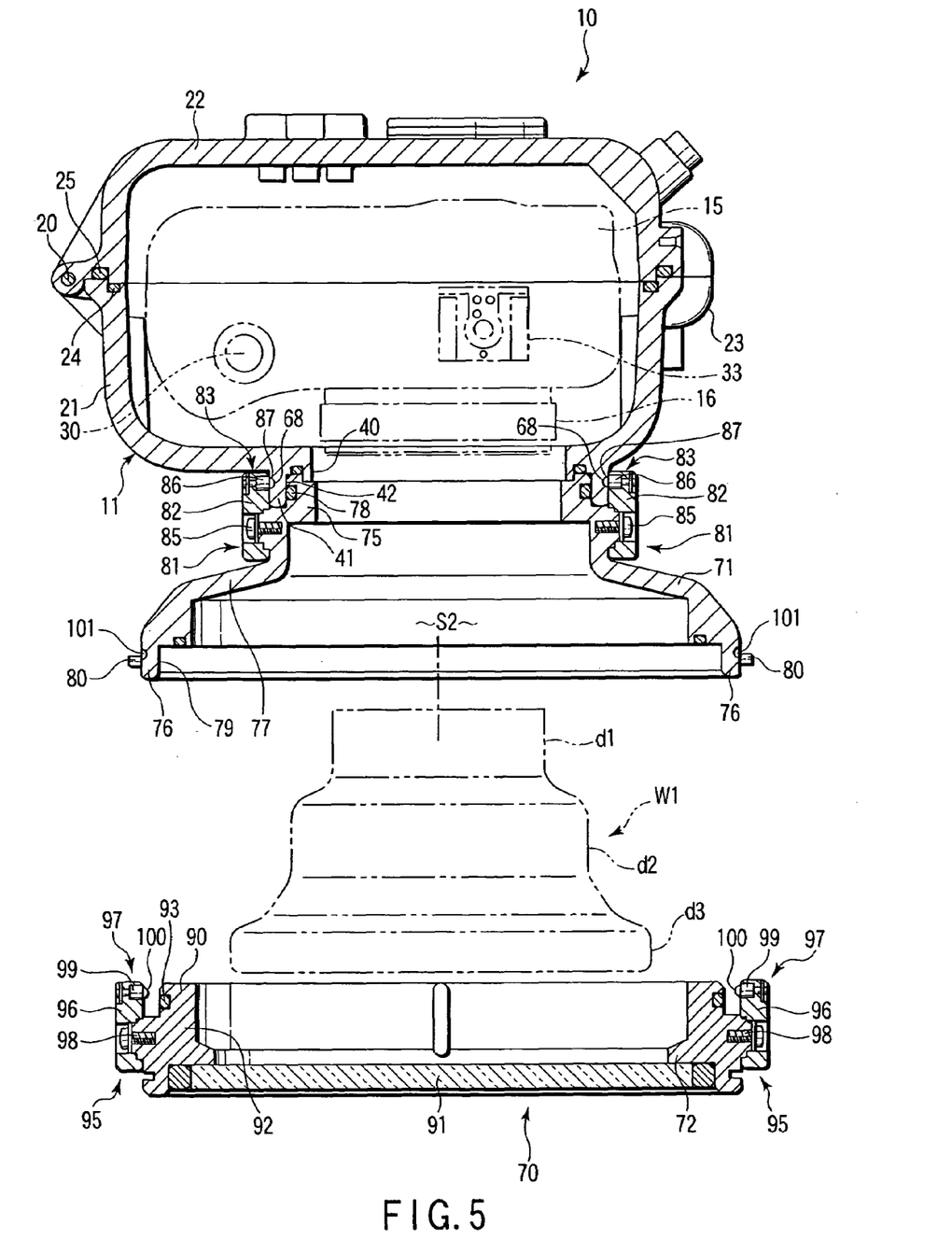
FIG. 5 is a cross-sectional view showing a first port member attached to a body protector of the waterproof protector device of FIG. 1.
Figure 6:
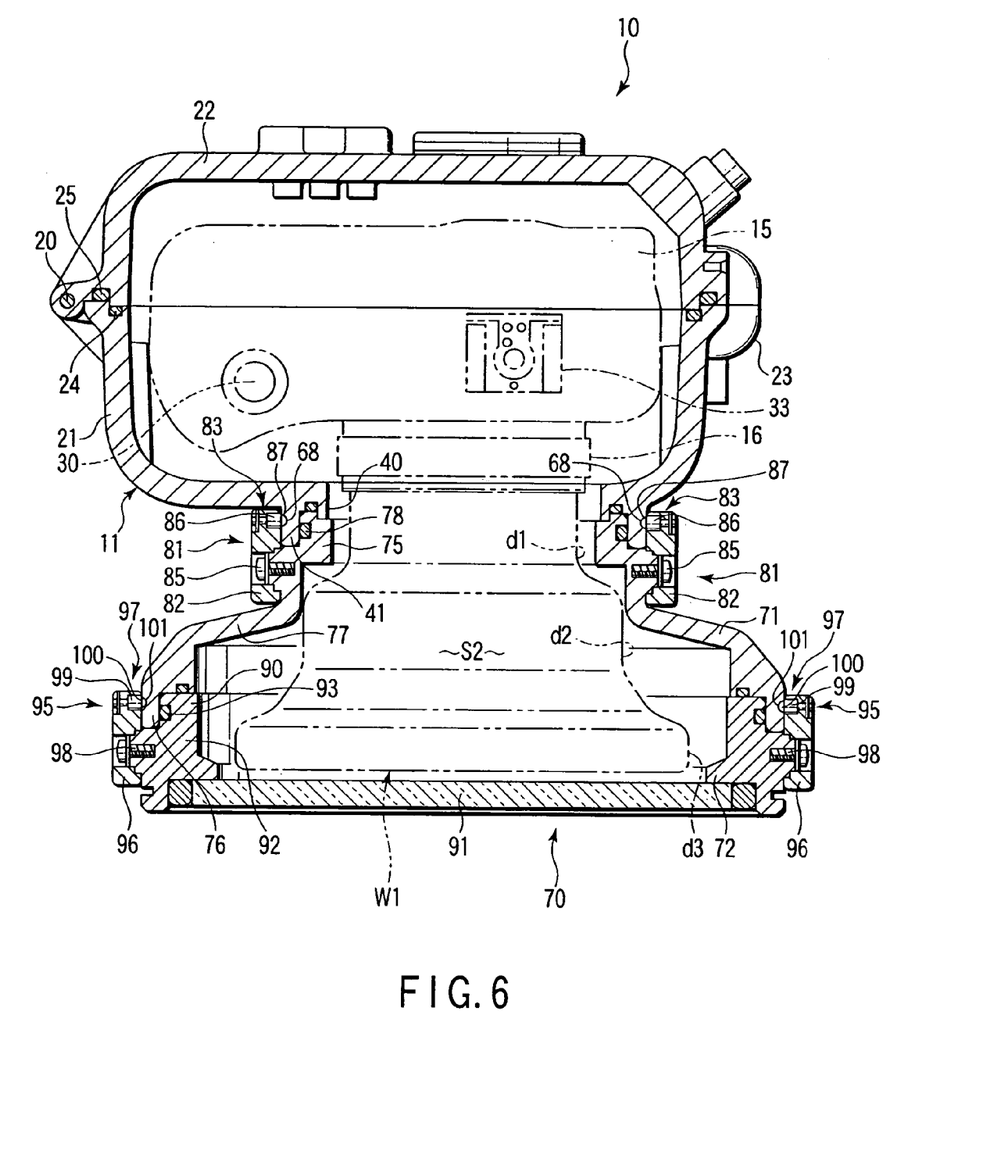
FIG. 6 is a cross-sectional view showing a second port member attached to the first port member shown in FIG. 5.

As shown in FIGS. 5 and 6, the wide port 70 can be attached to the first opening portion 41 of the body protector 11. A wide-conversion lens W1 can be housed in a waterproof space S2 that is defined inside the port 70. The lens W1 is an example of an accessory member according to the present invention. It is attached to the front of the frame 16 by a filter screw. The lens W1 is suited for wide-angle underwater photographing.

The outside diameter of the front end portion (subject side) of the wide-conversion lens W1 with respect to the optical axis direction is larger than that of the camera lens 17. The outside diameter of the rear end portion of the lens W1 with respect to the optical axis direction is smaller than the inside diameter of the first opening portion 41. The outside diameter of the front end portion of the lens W1 with respect to the optical axis is larger than the inside diameter of the opening portion 41.

The wide port 70 has a first port member 71 and a second port member 72. The first port member 71 is attached to the body protector 11. The second port member 72 is coupled to the first port member 71. The first port member 71 has a second opening portion 75 in the shape of a short cylinder, a third opening portion 76, and a barrel portion 77.

The second opening portion 75 can be fitted in the inner peripheral surface 42 of the first opening portion 41. The third opening portion 76 is situated nearer to the subject than the second opening portion 75 and is larger in diameter than the opening portion 75. The barrel portion 77 is formed between the second and third opening portions 75 and 76. The barrel portion 77 extends from the second opening portion 75 toward the subject in the optical axis direction.

The front end of the barrel portion 77 is open when the second port member 72 is disengaged from the first port member 71. The wide-conversion lens W1 can be attached to and detached from the camera body 15 through the open front end.

The barrel portion 77 is in the form of a cone of which the outside diameter increases from the second opening portion 75 toward the third opening portion 76. A waterproof seal member 78 such as an O-ring is located on the outer peripheral surface of the second opening portion 75. When the second opening portion 75 is fitted to the first opening portion 41, the seal member 78 is situated between the first and second opening portions 41 and 75.

An inner peripheral surface 79 of the third opening portion 76 is finished smooth, since it is used as a seal surface with which a seal member 93 on the second port member 72 is intimately in contact. A pair of protrusions 80 mentioned later that form a part of a second buckle mechanism 95 each are formed on the outer peripheral surface of the third opening portion 76.

A pair of buckle members 82, which constitute a first buckle mechanism 81 each, and detent mechanisms 83 are arranged near the barrel portion 77 of the first port member 71. The buckle members 82 are constructed in the same manner as the buckle members 53 of the standard port 1. Thus, the buckle members 82 of the first port member 71 can also rock around shafts 85, individually. They have their respective cam grooves (not shown) in which the protrusions 46 of the body protector 11 can be fitted individually, and can rock between a locked position and an unlocked position.

The second opening portion 75 of the first port member 71 is inserted in the first opening portion 41 of the body protector 11. When each buckle member 82 is rocked to the locked position, the cam groove on the buckle member 82, like the one shown in FIG. 4A, engages its corresponding protrusion 46. Thereupon, the first port member 71 is pressed against the body protector 11 as it is fixed to the protector 11.

When the buckle members 82 are rocked to the unlocked position, the first port member 71 is pushed out of the first opening portion 41 as the protrusions 46 leave their corresponding cam grooves. Thus, the port member 71 can be removed from the first opening portion 41 of the body protector 11.

The detent mechanisms 83 of the first port member 71 are constructed in the same manner as the detent mechanisms 65 of the standard port 1. More specifically, each detent mechanism 83 includes a retaining member 87. The retaining member 87 is urged by a spring portion 86. When the buckle members 82 reach the locked position, the retaining members 87 engage their corresponding recesses 68 on the side of the body protector 11. If this is done, the positions of the buckle members 82 are settled, and a so-called click feeling is produced. Thus, the arrival of the buckle members 82 at the locked position can be noticed.

The second port member 72 has a function to waterproof the waterproof space S2 that is defined in the first port member 71. The second port member 72 has a fourth opening portion 90, a light transmitting portion 91, a barrel portion 92 in the shape of a short cylinder, etc. The fourth opening portion 90 can be fitted in the third opening portion 76 of the first port member 71. The light transmitting portion 91 is located nearer to the subject than the fourth opening portion 90 with respect to the optical axis direction. The barrel portion 92 is formed between the fourth opening portion 90 and the light transmitting portion 91.

The light transmitting portion 91 is provided on the front end portion of the barrel portion 92. It allows light from the subject to land on the camera lens 17 via the wide-conversion lens W1. The light transmitting portion 91 is formed of a light transmitting material such as transparent glass. A waterproof seal member 93 such as an O-ring is located on the outer peripheral surface of the barrel portion 92. When the fourth opening portion 90 is fitted in the third opening portion 76, as shown in FIG. 6, the seal member 93 is located between the third and fourth opening portions 76 and 90.

A pair of buckle members 96 and detent mechanisms 97 are arranged on the opposite side portions of the barrel portion 92 of the second port member 72. They constitute second buckle mechanisms 95. The buckle members 96 are constructed in the same manner as the buckle members 53 of the standard port 1. They can rock individually around shafts 98 between a locked position and an unlocked position. The buckle members 96 have their respective cam grooves (not shown) in which the protrusions 80 (shown in FIG. 5) of the first port member 71 can be fitted individually.

The fourth opening portion 90 of the second port member 72 is inserted in the third opening portion 76 of the first port member 71. When the buckle members 96 are rocked to the locked position, the cam grooves therein are fitted on their corresponding protrusions 80. Thereupon, the second port member 72 is pressed against and fixed to the first port member 71.

When the buckle members 96 are rocked to the unlocked position, the second port member 72 is slightly pushed out of the third opening portion 76 of the first port member 71. At the same time, the protrusions 80 leave their corresponding cam grooves, so that the second port member 72 can be removed from the first port member 71.

The detent mechanisms 97 of the second port member 72 are constructed in the same manner as the detent mechanisms 65 of the standard port 1. More specifically, each detent mechanism 97 includes a retaining member 100 that is urged by a spring portion 99. When the buckle members 96 are moved to the locked position, the retaining members 100 engage their corresponding recesses 101 on the side of the first port member 71. If this is done, the positions of the buckle members 96 are settled, and a click feeling is produced. Thus, the arrival of the buckle members 96 at the locked position can be noticed.

The following is a description of the operation of the waterproof protector device 10 according to the embodiment described above.

FIGS. 1 and 2 illustrate a case where photographing is performed by using only the camera lens 17 with which the camera body 15 is equipped in a standard way. In this case, the opening portion 55 of the standard port 1 is fitted into the first opening portion 41 of the body protector 11. The standard port 1 is fixed to the body protector 11 by means of the buckle mechanisms 45. The standard port 1 is equivalent to a third port member according to this invention. The opening portion 55 at the rear end of the standard port 1 is a fifth opening portion according to this invention.

When using the wide-conversion lens W1, the standard port 1 is disengaged from the first opening portion 41 of the body protector 11, as shown in FIG. 3. Thereafter, the second opening portion 75 of the first port member 71 is inserted into the first opening portion 41 of the body protector 11, as shown in FIG. 5. Then, the first port member 71 is fixed to the body protector 11 by means of the first buckle mechanisms 81.

Before the second port member 72 is attached to the first port member 71, that is, when the second port member 72 is off the first port member 71, the wide-conversion lens W1 is attached to the camera body 15 from outside the first port member 71. The lens W1 can be attached to the camera body 15 by screwing the internal thread portion (filter screw) of the frame 16 of the body 15, for example.

Accessory members according to this invention include various accessory lenses, filters (not shown), etc., as well as the wide-conversion lens W1. These accessory members may be attached to the camera lens 17 with use of a filter screw, an internal thread portion for filter attachment, instead of being attached to the camera body 15.

After the wide-conversion lens W1 is attached to the camera body 15, as is shown in FIG. 6, the fourth opening portion 90 of the second port member 72 is inserted into the third opening portion 76 of the first port member 71. Then, the second port member 72 is fixed to the first port member 71 by means of the second buckle mechanisms 95.

When the power of the camera body 15 is switched on, thereafter, the camera lens 17 as a moving part projects toward the subject, as indicated by two-dot chain line in FIG. 2, from a collapsed state in which it is housed in the body 15. Thus, the lens 17 penetrates the rear part of the cylinder portion of the wide-conversion lens W1, whereupon a standby state for photographing is established.

A lens group of the wide-conversion lens W1 is located on the front side (middle portion d2 and large-diameter portion d3 in FIG. 5) facing the subject with respect to a middle part of an optical axis in the frame of the lens W1. Since the rear side (small-diameter portion d1 in FIG. 5) of the lens W1 is substantially hollow, the camera lens 17 can get into the lens W1.

According to the waterproof protector device 10 of the present embodiment, a relatively large-sized accessory member, such as the wide-conversion lens W1, can be housed integrally with the camera body 15 in the waterproof space S2 that is defined by the body protector 11 and the first and second port members 71 and 72.

In the waterproof protector device 10, the wide-conversion lens W1 is attached directly to the camera body 15, so that the respective optical axes of the body 15 and the lens W1 cannot be misaligned. Since the standard port 1 and the wide port 70 can be alternatively attached as required to the body protector 11, moreover, photographing can be performed depending on the angle of view.

As shown in FIGS. 5 and 6, the wide port 70 according to this embodiment has a shape such that it extends substantially along the outer periphery of the wide-conversion lens W1. More specifically, the wide port 70 is composed of the first and second port members 71 and 72. The first port member 71 has a shape such that it extends along the small-diameter portion d1 and the middle portion d2 of the lens W1. The second port member 72 shaped so as to extend along the large-diameter portion d3 of the lens W1. Thus, the lens W1 that has the large-diameter portion d3 on the front side can be housed in the waterproof space S2 that has a relatively small internal capacity, so that generation of undue buoyancy can be avoided.

The wide port 70 can be replaced with the standard port 1 by inversely following the aforesaid procedure. More specifically, the second buckle mechanisms 95 are unlocked, and the second port member 72 is disengaged from the first port member 71. Thereafter, the wide-conversion lens W1 is removed from the camera body 15. Further, the first buckle mechanisms 81 are unlocked, and the first port member 71 is disengaged from the body protector 11. Thereafter, the standard port 1 is attached to the body protector 11. Then, the buckle mechanisms 81 are locked.

It is to be understood, in carrying out the present invention, that the components of the invention, including the body protector and the first and second port members, may be variously changed or modified without departing from the scope or spirit of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A waterproof protector system for a camera, comprising:
   a body protector which has an opening opposed to a front face of a camera lens of a camera body and a first opening portion provided around the opening and can store the camera body in a waterproof manner;

a first port member which has a second opening portion connectable to the first opening portion, a third opening portion located nearer to a subject than the second opening portion and larger than the second opening portion, and a conical barrel portion connecting the second opening portion and the third opening portion, can store an accessory member attachable to the camera body or the camera lens, and allows the accessory member to be attached to and detached from the camera body from outside the body protector with the first port member connected to the body protector; and a second port member which has a fourth opening portion connectable to the third opening portion, a light transmitting portion provided on the side of the subject opposite the fourth opening portion with respect to the optical axis direction, and a barrel portion connecting the fourth opening portion and the light transmitting portion, and covers the third opening portion with the fourth opening portion connected to the third opening portion, thereby waterproofing respective inside spaces of the body protector and the first port member;

wherein waterproof seal members are arranged between the first opening portion and the second opening portion and between the third opening portion and the fourth opening portion, individually.

2. A waterproof protector system for a camera, comprising:

a body protector which has an opening opposed to a front face of a camera lens of a camera body and a first opening portion provided around the opening and can store the camera body in a waterproof manner;

a first port member which has a second opening portion connectable to the first opening portion, a third opening portion located nearer to a subject than the second opening portion and larger than the second opening portion, and a conical barrel portion connecting the second opening portion and the third opening portion, can store an accessory member attachable to the camera body or the camera lens, and allows the accessory member to be attached to and detached from the camera body from outside the body protector with the first port member connected to the body protector; and a second port member which has a fourth opening portion connectable to the third opening portion, a light transmitting portion provided on the side of the subject opposite the fourth opening portion with respect to the optical axis direction, and a barrel portion connecting the fourth opening portion and the light transmitting portion, and covers the third opening portion with the fourth opening portion connected to the third opening portion, thereby waterproofing respective inside spaces of the body protector and the first port member;

wherein the accessory member can be attached to and detached from the camera body with the first port member attached to the body protector and with the second port member not attached to the first port member.

3. A waterproof protector system for a camera according to claim 2, wherein the accessory member is a wide-conversion lens.

4. A waterproof protector system for a camera, comprising:

a body protector which has an opening opposed to a front face of a camera lens of a camera body and a first opening portion provided around the opening and can store the camera body in a waterproof manner;

a first port member which has a second opening portion connectable to the first opening portion, a third opening portion located nearer to a subject than the second opening portion and larger than the second opening portion, and a conical barrel portion connecting the second opening portion and the third opening portion, can store an accessory member attachable to the camera body or the camera lens, and allows the accessory member to be attached to and detached from the camera body from outside the body protector with the first port member connected to the body protector; and a second port member which has a fourth opening portion connectable to the third opening portion, a light transmitting portion provided on the side of the subject opposite the fourth opening portion with respect to the optical axis direction, and a barrel portion connecting the fourth opening portion and the light transmitting portion, and covers the third opening portion with the fourth opening portion connected to the third opening portion, thereby waterproofing respective inside spaces of the body protector and the first port member;

wherein the accessory member can be attached to and detached from the camera lens with the first port member attached to the body protector and with the second port member not attached to the first port member.

5. A waterproof protector system for a camera according to claim 4, wherein the accessory member is a wide-conversion lens.

6. A waterproof protector system for a camera according to claim 5, wherein the outside diameter of a rear end portion of the wide-conversion lens with respect to the optical axis direction is smaller than the diameter of the first opening portion, and the outside diameter of a front end portion of the lens with respect to the optical axis direction is larger than the diameter of the first opening portion.

7. A waterproof protector device for a camera, comprising:

a body protector which has an opening opposed to a front face of a camera lens of a camera body and a first opening portion provided around the opening and can store the camera body in a waterproof manner;

a first port member which has a second opening portion connectable to the first opening portion, a third opening portion located nearer to a subject than the second opening portion and larger than the second opening portion, and a conical barrel portion connecting the second opening portion and the third opening portion, and can store an accessory member attachable to the camera body or the camera lens; and a second port member which has a fourth opening portion connectable to the third opening portion, a light transmitting portion provided on the side of the subject opposite the fourth opening portion with respect to the optical axis direction, and a barrel portion connecting the fourth opening portion and the light transmitting portion, and covers the third opening portion with the fourth opening portion connected to the third opening portion, thereby waterproofing respective inside spaces of the body protector and the first port member;

wherein waterproof seal members are arranged between the first opening portion and the second opening portion and between the third opening portion and the fourth opening portion, individually.

8. A waterproof protector device for a camera, comprising:

a body protector which has an opening opposed to a front face of a camera lens of a camera body and a first opening portion provided around the opening and can store the camera body in a waterproof manner;

a first port member which has a second opening portion connectable to the first opening portion, a third opening portion located nearer to a subject than the second opening portion and larger than the second opening portion, and a conical barrel portion connecting the second opening portion and the third opening portion, and can store an accessory member attachable to the camera body or the camera lens; and a second port member which has a fourth opening portion connectable to the third opening portion, a light transmitting portion provided on the side of the subject opposite the fourth opening portion with respect to the optical axis direction, and a barrel portion connecting the fourth opening portion and the light transmitting portion, and covers the third opening portion with the fourth opening portion connected to the third opening portion, thereby waterproofing respective inside spaces of the body protector and the first port member;

wherein the accessory member can be attached to and detached from the camera body with the first port member attached to the body protector and with the second port member not attached to the first port member.

9. A waterproof protector device for a camera according to claim 8, wherein the accessory member is a wide-conversion lens.

10. A waterproof protector device for a camera, comprising:

a body protector which has an opening opposed to a front face of a camera lens of a camera body and a first opening portion provided around the opening and can store the camera body in a waterproof manner;

a first port member which has a second opening portion connectable to the first opening portion, a third opening portion located nearer to a subject than the second opening portion and larger than the second opening portion, and a conical barrel portion connecting the second opening portion and the third opening portion, and can store an accessory member attachable to the camera body or the camera lens; and a second port member which has a fourth opening portion connectable to the third opening portion, a light transmitting portion provided on the side of the subject opposite the fourth opening portion with respect to the optical axis direction, and a barrel portion connecting the fourth opening portion and the light transmitting portion, and covers the third opening portion with the fourth opening portion connected to the third opening portion, thereby waterproofing respective inside spaces of the body protector and the first port member;

wherein the accessory member can be attached to and detached from the camera lens with the first port member attached to the body protector and with the second port member not attached to the first port member.

11. A waterproof protector device for a camera according to claim 10, wherein the accessory member is a wide-conversion lens.

12. A waterproof protector device for a camera according to claim 11, wherein the outside diameter of a rear end portion of the wide-conversion lens with respect to the optical axis direction is smaller than the diameter of the first opening portion, and the outside diameter of a front end portion of the lens with respect to the optical axis direction is larger than the diameter of the first opening portion.

* * * * *